United States Patent
Pudar (10) Patent No.: US 8,565,948 B2
(45) Date of Patent: Oct. 22, 2013

(54) ENERGY CONSUMPTION COMPARISON METHOD

(75) Inventor: Nikola J. Pudar, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 791 days.

(21) Appl. No.: 12/635,359

(22) Filed: Dec. 10, 2009

(65) Prior Publication Data

US 2011/0144839 A1    Jun. 16, 2011

(51) Int. Cl.
*G06F 7/00* (2006.01)

(52) U.S. Cl.
USPC ............................................. 701/22; 903/902

(58) Field of Classification Search
USPC ........ 701/22, 36, 59, 66, 99, 29.1, 29.6, 32.5, 701/32.9; 180/65.26, 65.285, 65.1, 65.21, 180/65.27; 903/902–905
See application file for complete search history.

(56) References Cited

U.S. PATENT DOCUMENTS

2008/0027639 A1*    1/2008    Tryon ............................ 701/209
2010/0138142 A1*    6/2010    Pease ............................ 701/123

* cited by examiner

*Primary Examiner* — Dalena Tran
(74) *Attorney, Agent, or Firm* — Anthony Luke Simon; Reising Ethington P.C.

(57) ABSTRACT

A method and system for determining comparative performance of an alternative fuel vehicle, such as an electric or hybrid vehicle, based on actual use of an existing gasoline or diesel fuel vehicle. The method includes obtaining trip data from an existing vehicle, determining performance metrics of the vehicle based on the trip data, determining simulated performance metrics of an alternative fuel vehicle based on the trip data, comparing the performance metrics of the existing vehicle and the simulated performance metrics of the alternative fuel vehicle, and presenting the comparison to the operator.

19 Claims, 6 Drawing Sheets

ENERGY CONSUMPTION COMPARISON METHOD

TECHNICAL FIELD

The present invention relates generally to vehicles and more particularly to telematics services with respect to vehicles.

BACKGROUND OF THE INVENTION

Increasingly, vehicle manufacturers outfit their vehicles with a wide array of wireless communications capabilities. Vehicle telematics devices installed in modern vehicles can wirelessly send both voice and data communications to a variety of recipients. Recipients can be central facilities that include servers and/or live advisors capable of responding to the telematics unit. Vehicles equipped with telematics units have the ability to gather a diverse array of data about vehicles and send it via the telematics device.

Additionally, vehicle manufacturers are equipping vehicles with more efficient vehicle powerplants, which can operate using alternative fuels. In one example, an alternative fuel vehicle operates using an electric motor supplied with energy from a battery. In another example, the electric motor can be charged with an internal combustion engine. Other configurations of alternative fuel vehicles are possible. And different configurations of alternative fuel vehicles can be optimized for specific conditions.

SUMMARY OF THE INVENTION

According to an aspect of the invention, there is provided a method of obtaining vehicle operator driving habits and determining the energy consumption of vehicles. The steps include obtaining trip data from an existing vehicle driven by a vehicle operator, determining performance metrics of the vehicle based on the trip data, determining simulated performance metrics of an alternative fuel vehicle based on the trip data, comparing the performance metrics of the existing vehicle and the simulated performance metrics of the alternative fuel vehicle, and presenting the comparison to the operator.

According to another aspect of the invention, there is provided a method of obtaining vehicle operator driving habits and determining the energy consumption of vehicles. The steps include sending an ignition-on time stamp and odometer reading from a plurality of vehicles to a call center, sending an ignition-off time stamp and odometer reading from the plurality of vehicles to the call center, determining vehicle trip data based on associated ignition-on and ignition-off time stamps and odometer readings from each of the vehicles, processing the vehicle trip data for the plurality of vehicles, and calculating a theoretical range for a alternative fuel vehicle based on the processed data, wherein the theoretical range is based on the battery power of one or more batteries installed on the alternative fuel vehicle.

According to yet another aspect of the invention, there is provided a method of obtaining vehicle operator driving habits and determining the energy consumption of vehicles. The steps include recording a time stamp and odometer reading for one or more vehicles at ignition-on, uploading the ignition-on time stamp and the odometer reading for one or more vehicles to a call center following the ignition-on, recording a time stamp and an odometer reading for the one or more vehicles at ignition-off, uploading the ignition-off time stamp and the odometer reading for the one or more vehicles to the call center following the ignition-off, calculating a plurality of trip durations and times of day based on the uploading of the ignition-on time stamp and the uploading of the ignition-off time stamp, determining an average trip duration at periodic times during a day, determining the vehicle performance metrics of a particular vehicle based on a vehicle identifier and the ignition-on and ignition-off uploads for the particular vehicle, creating a hypothetical alternative fuel vehicle profile based on the determined vehicle performance of the particular vehicle, and graphically displaying the determined average trip durations and times of day, the performance metrics of the particular vehicle, and the hypothetical alternative fuel vehicle profile to a vehicle owner.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and method described below involves vehicle operator driving habits and energy consumption of vehicles. More specifically, the system monitors vehicle operator driving habits or trip habits for a plurality of vehicles. These habits include trip data relating to the number, length, and/or duration of the trips each vehicle takes that can be monitored over a period of time (e.g. several months). The gathered data can be processed or analyzed to understand the driving habits of the operators of vehicles in one or multiple geographical areas. The gathered data can reveal particular statistics about driving habits, such as the average number of miles the plurality of vehicles travel over a period of time, the time(s) of day during which the vehicle is operated, the amount of time during which the vehicle is not operated, and the time of day at which the vehicle is parked. These are merely examples and other statistical calculations are possible. The processed trip data can inform vehicle designers about how vehicle operators use their vehicles and therefore how the design of future vehicles can meet these uses. For instance, in one example of an alternative fuel vehicle an electric vehicle can use a battery and electric motor for propulsion. Various designs of batteries and electric motors are possible for electric vehicles, such as a vehicle having a battery appropriately-sized to propel the vehicle over a range of seven miles or a battery sized for forty miles. Depending on the gathered/processed data, vehicle designers may choose the battery sized to propel the vehicle over a range of forty miles if a large number of drivers would benefit form that range.

Figure 1:
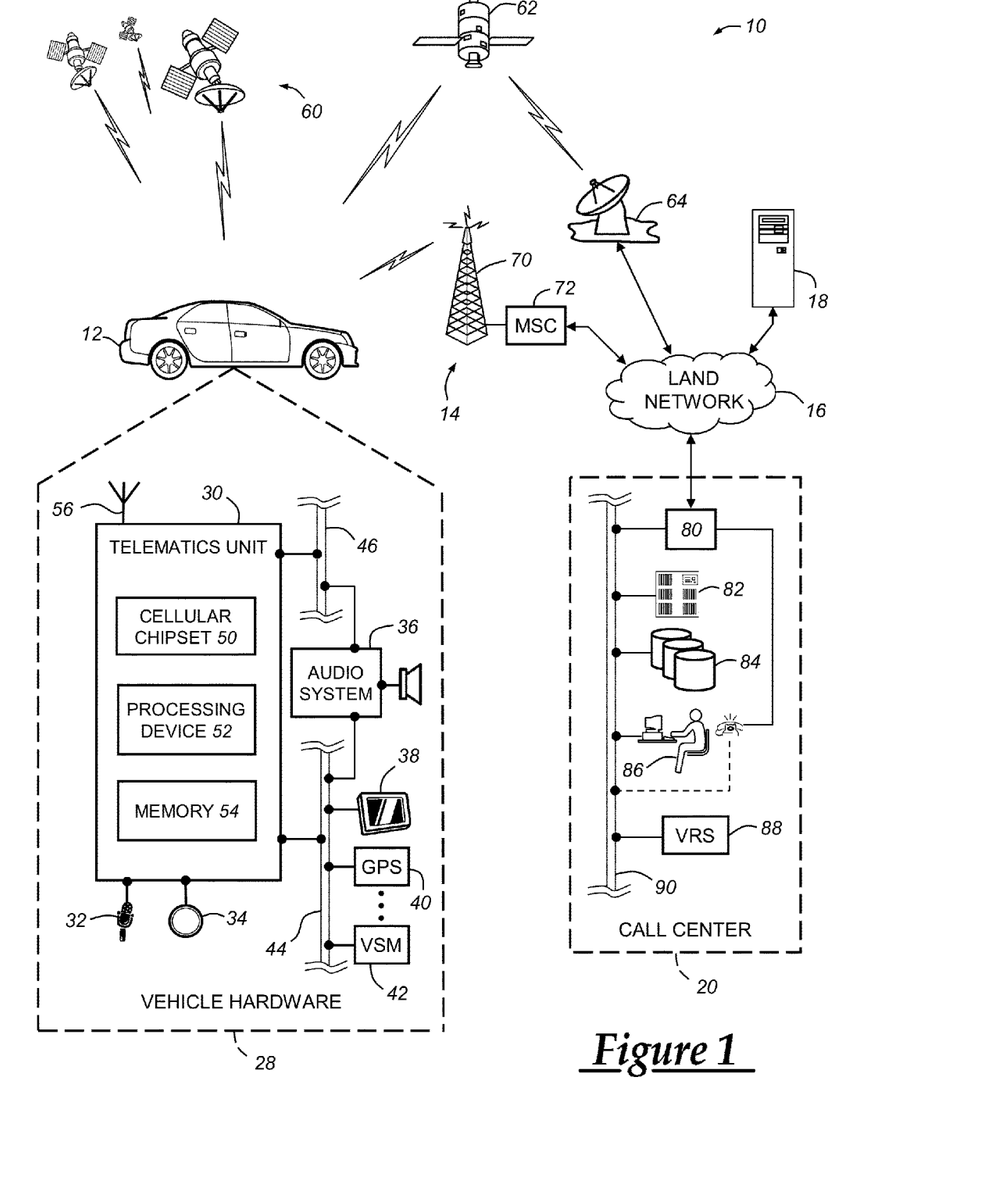
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle telematics unit (VTU) 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via short message service (SMS) or packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, W-CDMA, or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols used in the wireless industry such as 3gpp or 3gpp2. Wireless networking between the vehicle and other networked devices can also be carried out using telematics unit 30. For this purpose, telematics unit 30 can be configured to communicate wirelessly according to one or more protocols implemented per 3gpp or 3gpp2 standards and also other wireless protocols, such as any of the IEEE 802.11 protocols, WiMAX, or Bluetooth. When used for packet-switched data communication such as TCP/IP, the telematics unit can be configured with a static IP address or can be set up to automatically receive a dynamically assigned IP address from another device on the network, such as from a router or from a network address server (e.g., a DHCP server).

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 2G CDMA (IS-95), 3G CDMA2000 (IS-2000, 1XRTT, EVDO), 2G/2.5G GSM (GPRS, EDGE), or 3G W-CDMA (UMTS, HSPA). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, a packet-switched data network (PSDN), and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. For example, computer 18 can be connected to one or more of the other system 10 components via a private or virtual private network (VPN) implemented through a leased line or Internet ISP in the PSDN. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless local network using protocols such as 802.11x and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
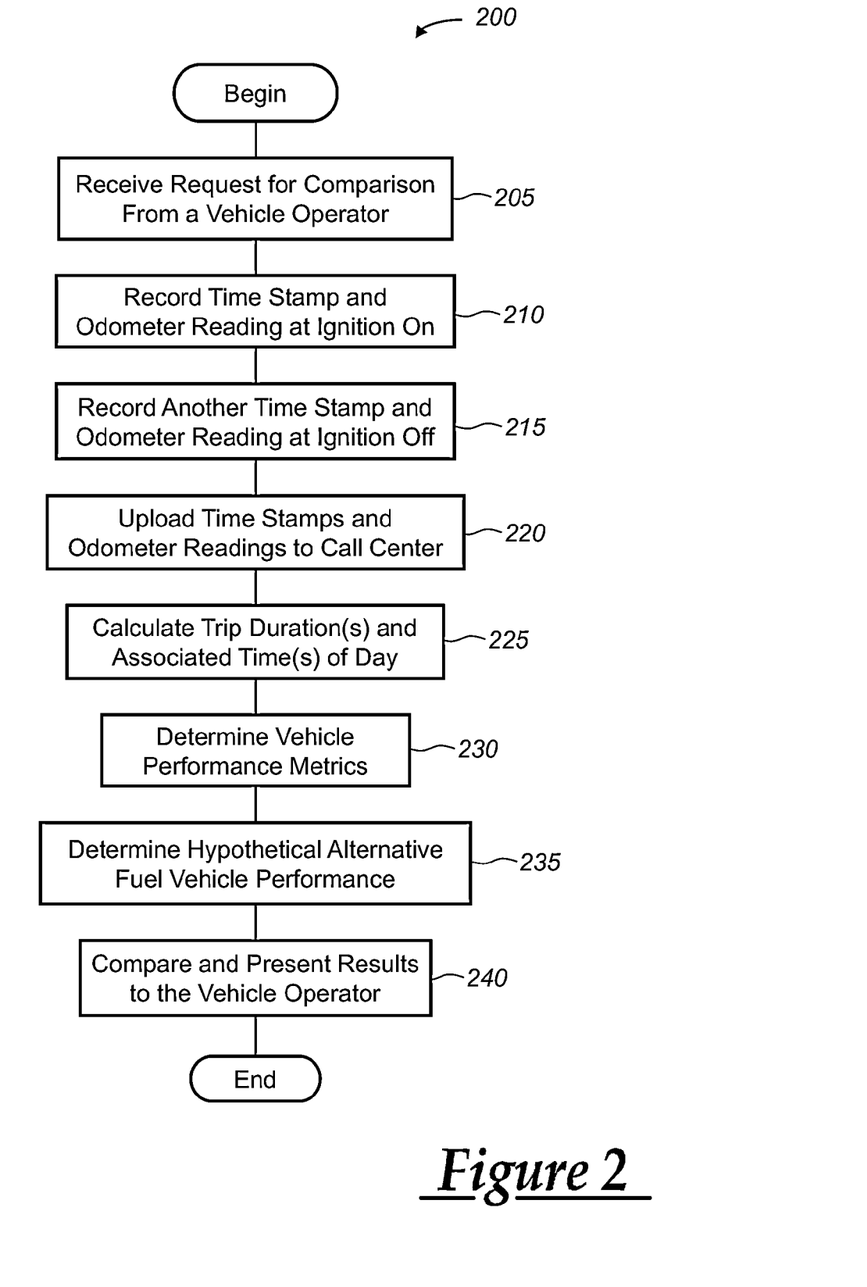
FIG. 2 is a block diagram depicting an exemplary embodiment of a method of obtaining vehicle operator habits and determining the energy consumption of a plurality of vehicles.

Turning now to FIG. 2, there is an exemplary embodiment of a method of determining expected performance of an alternative fuel vehicle based on actual use of an existing vehicle. The method can also be used to obtain vehicle operator driving habits and provide a comparison of the energy consumption of vehicles. The method 200 begins at step 205 with receiving a request for comparison from a vehicle operator. The request initiates the monitoring of an existing vehicle 12 to record vehicle performance metrics created from driving habits and translating those metrics into the hypothetical performance of an alternative fuel vehicle based on those metrics. In that sense, the vehicle operator can understand how the alternative fuel vehicle would perform if he drove one the same way the operator drove his or her existing vehicle. The request begins the monitoring of the vehicle 12. It can be sent from a vehicle operator in a vehicle 12 using the telematics unit 30 and received at the call center 20. In another example, the call center 20 can receive the request from a vehicle operator who placed it through a web portal using a personal computer (PC), smart phone, or personal digital assistant (PDA). Some cases may involve soliciting vehicle operators and alerting them of this service. In those cases, an email containing a hyperlink can be sent from a call center 20 to the vehicle operator directing the operator to a web portal able to accept the request. The term vehicle operator includes a wide variety of individuals or organizations that may be related to the vehicle 12. For instance, vehicle operator can include a person who claims legal ownership of the vehicle but other examples include leasing organizations, business entities, or rental car fleets. The method 200 proceeds to step 210.

At step 210, a time stamp and odometer reading is recorded for one or more vehicles at ignition on. Ignition on generally involves the vehicle operator actuating a vehicle ignition switch. For instance, the vehicle ignition switch can be a button or key-actuated switch that controls the operation of the vehicle 12. Usually, the vehicle ignition switch includes the settings "off", "accessories", "run", and "start". Ignition on can occur when a vehicle operator changes the position of the vehicle ignition switch from "off" to "accessories", "run", or "start". At that time, an ignition switch position change is detected. In one example, the telematics unit 20 detects the change and accesses at least one VSM 42 maintaining the time and day at which the change occurs and the odometer reading of the vehicle 12 at that time and day. The time and day can then be recorded as a time stamp along with the odometer reading in one or more of the digital memory devices 54. One or more vehicles 12 or a group of vehicles 12 can be identified in a variety of ways. For instance, individual vehicles 12 can be identified based on a VIN. Groups of vehicles can be identified based on a number of factors. In one example, a group of vehicles can be identified by the geographic location of their registration or sale. In other examples, the vehicles 12 can be identified by the make, model, engine size, or vehicle purchase date. The method 200 proceeds to step 215.

At step 215, another time stamp and odometer reading is recorded for the one or more vehicles at ignition off. Ignition off is similar to ignition on and also generally involves the vehicle operator actuating the vehicle ignition switch. Ignition off can occur when a vehicle operator changes the position or function of the vehicle ignition switch from "accessories", "run", or "start" to "off". At that time, for example, the telematics unit 20 can detect the change in the switch setting to the "off" position and access at least one VSM 42 maintaining the time and day at which the change occurs and the odometer reading of the vehicle 12 at that time and day. The time and day can then be recorded as a time stamp along with the odometer reading in at least one of the digital memory devices 54. The method 200 proceeds to step 220.

At step 220, the time stamp and odometer reading recorded at ignition on and the time stamp and odometer reading recorded at ignition off are uploaded to the call center. This action can indicate the beginning and end of a trip from both a distance perspective, but also a time of day perspective as well. The upload function can occur automatically without action on the part of the vehicle operator. The telematics unit 30 can access the time stamp and odometer readings from ignition on or ignition off and send either or both to the call center 20 or other central facility. It should be appreciated that the upload can take place after both the ignition on and ignition off events occur or an upload can take place after the ignition on event and again after the ignition off event. The upload can be sent via the wireless communication system 14. The method 200 proceeds to step 225.

At step 225, a plurality of trip durations and times of day are calculated based on the uploading of the ignition on time stamp and odometer reading and the uploading of the ignition off time stamp and odometer reading. The trip durations and times of day are examples of vehicle performance metrics. Trip duration can include a distance travelled, the day on which the trip occurred, and/or a time window during which the trip took place. A time window can be the start time, end time, and/or date during which the trip occurred. And trip durations/times of day can be calculated in several ways. In one example a vehicle operator can use his vehicle 12 to drive to work. This event may be periodic, taking place every morning at a substantially similar time, such as 7:00 AM. When the vehicle operator begins his commute, he can actuate the vehicle ignition switch, moving it from the "off" position to the "start" and later the "run" positions. When the vehicle operator does so, the telematics unit 30 or other similar device can determine the time (in this case 7:00 AM) and the odometer reading (e.g. 1200 miles) and then upload both to the call center 20. In another example, the telematics unit 30 can save the time and odometer readings for later use, such as in digital memory device 54. As the vehicle operator drives the vehicle 12 to work, time elapses and miles are travelled. Eventually, the vehicle operator arrives at work. When that happens, the vehicle operator turns the vehicle ignition switch to the "off" position and the telematics unit 30 can determine the time the vehicle operator does this and the odometer reading at this time. For example, the time could then be 7:45 AM and the odometer could read 1230 miles at ignition off. Using this data, the telematics unit 30 can calculate the distance of the trip (30 miles) and its duration (45 minutes). These calculations can be sent along with the ignition on and ignition off data or can be omitted and the call center can perform the calculations. Otherwise, each vehicle 12 can upload the ignition on and ignition off data to the call center 20, which can calculate various vehicle performance metrics based on the data. The method 200 proceeds to step 230.

At step 230, vehicle performance metrics of a particular vehicle are determined based on a vehicle identifier and the ignition on and ignition off uploads. Vehicle performance metrics include calculations performed on the data received during the ignition on or ignition off upload. Examples of vehicle performance metrics include the number of trips taken by the one or more vehicles, the total miles travelled by the vehicles, the number of days a vehicle 12 is monitored, the average miles travelled per trip for each vehicle 12, the average miles travelled per day by each vehicle 12, the total number of miles travelled that would be electrically-powered if undertaken in an alternative fuel vehicle, the number of miles that would be petroleum-powered if undertaken in an alternative fuel vehicle, or the number of trips taken by a vehicle. These are some examples of vehicle performance metrics and others are possible. Many if not most of these calculations can be performed by the call center 20 although other facilities may also perform these services.

The number of trips taken by the one or more vehicles can be the number of trips taken by one vehicle or the number of trips taken by all of the one or more vehicles. A vehicle trip can be begin and end with an ignition on and ignition off However, vehicle operators often will make stops along a particular route. And during those stops the vehicle operator may move the vehicle ignition switch to "off" creating an ignition off event, even though the vehicle might not be at the end of a vehicle trip. As a result, some vehicle trips can be composed of a plurality of ignition on and ignition off events. In order to link a plurality of ignition on and ignition off events during one trip, it can be helpful to chain the ignition on and ignition off events. To do so, the vehicle 12 may refrain from uploading vehicle performance metrics until a defined period of time has passed after ignition off. The defined period of time is variable, but one value can be 30 minutes. In other words, the vehicle 12 can detect an ignition event followed by an ignition off event. After the ignition off event, the vehicle 12 can wait for 30 minutes to determine if another ignition on event will occur. If the ignition on event does occur within the 30 minutes, the vehicle 12 can wait to upload the vehicle metrics until 30 minutes passes after an ignition off event without experiencing an ignition on event. At that time, the vehicle 12 will consider the linked ignition on and ignition off events as part of the same trip. Chaining of ignition events can also be done based on GPS location. For example, if a home location can be determined for the vehicle (i.e., the location where the vehicle is typically parked each night), then that location can be used to determine if an ignition-off event marks an intermediate stop (vehicle not at the home location) or an end-of-trip stop (vehicle is at its home location). In this way, multiple errands can be chained together and treated as one single trip.

The total miles travelled by the vehicles can be calculated using the odometer readings obtained during the ignition on and ignition off uploads. In one example, the total miles travelled can be obtained by uploading an initial odometer reading during an ignition on upload and uploading a final odometer reading during an ignition off upload. Also monitored are the total number of days one or more vehicles are monitored, as well as the average miles a day a vehicle or vehicles travel(s), and/or the average miles per trip a vehicle or vehicles travel(s). The average miles a vehicle travels per day can be determined at the call center 20 by summing the number of miles travelled by one or more vehicles and divided by the number of vehicles. This value can be obtained by subtracting the lowest odometer reading of the day for a vehicle from the highest odometer reading of the day for any vehicle. The value can then be recorded for each vehicle for each day and averaged over any length of time desired. The total number of days can be noted at the call center 20 when beginning and ending a monitoring period of one or more vehicles or can be calculated using the dates of the first upload from a vehicle 12 and the last upload from the vehicle 12. And the average miles per trip can be calculated by summing the number of miles driven during the monitoring period and dividing it by the number of trips.

The performance metrics for a particular vehicle can be saved using a unique vehicle identifier. While the performance metrics of one or more vehicles can be combined to create statistics for the one or more vehicles as a group, the performance of any particular vehicle can be saved and/or examined using the unique vehicle identifier. An example of the unique vehicle identifier includes vehicle identification numbers (VIN) associated with the production of vehicles 12. Using the VIN, or some portion of the VIN, vehicle performance metrics can be associated with a particular vehicle 12. However, it should be appreciated that other schemes for uniquely identifying vehicles are possible and that many codes, numerical or alphanumerical, can be used. The method 200 proceeds to step 235.

At step 235, a hypothetical alternative fuel vehicle profile is created based on the determined vehicle performance metrics of a particular vehicle. In one example, the vehicle operator requests a comparison between the vehicle performance metrics provided by a currently-owned vehicle and how those vehicle metrics would perform if generated by an alternative fuel vehicle. In other words, it is possible to know the performance characteristics of the alternative fuel vehicle and compare the acquired vehicle performance metrics of the particular vehicle with the characteristics of the alternative fuel vehicle. The result of the comparison can be a hypothetical alternative fuel vehicle profile. An alternative fuel vehicle can include vehicles that are not solely powered by an internal combustion engine, such as those vehicles that use a battery or batteries and electric motor(s) to at least partially propel the vehicle and are supplemented by an internal combustion engine. Other examples include hybrid systems, propane, pure electric vehicles, and electric hybrid among others. And these vehicles can have known performance characteristics. For example, these characteristics can include having a range of 40 miles powered by electricity alone, usually receiving an overnight battery charge, costing 2¢ per mile in charging expense, or travelling 30 miles per gallon of conventional gasoline. Other assumptions can be made, such as the cost of conventional gasoline equaling $2.75 per gallon. Using these assumptions, the vehicle performance metrics collected from the particular vehicle can be applied to the characteristics of an alternative fuel vehicle to generate the hypothetical alternative fuel vehicle profile. In one instance, one vehicle indentified by its VIN was monitored for 45 days. During those days, the vehicle 12 took 199 trips, travelled 1637 miles, averaged 36.4 miles a day, and 8.2 miles per trip. Given this data, the trips undertaken each day undertaken under a distance of 40 miles can be classified as electric miles while those trip miles over a distance of 40 miles can be classified as petroleum miles. Put differently, electric mile classifications indicate that the miles of the trip taken in a conventionally-powered vehicle would have been powered solely by electricity. And petroleum mile classifications indicate that those miles of the trip would be powered in some way by conventional fuel (e.g. gasoline).

In the present example, of the 199 trips over 1637 miles, 1449 of those miles would be classified as electric miles (i.e. 88.5%). Using the assumption that electric miles cost 2¢ a mile, travelling those electric miles would cost the vehicle operator $28.98. And using the assumptions about conventional fuel consumption and cost, the remaining 188 petroleum miles would use roughly 6.27 gallons and cost an additional $17.24. Adding the cost of the electric and petroleum miles equals $46.22. Other assumptions can be used to generate operating costs of the currently owned vehicle. For instance, the currently owned vehicle can have an EPA combined fuel economy rating of a particular value. In the present example, the combined fuel economy rating could be 24 miles per gallon (MPG). Using the number of miles travelled over the 45 days (1637), the MPG of the present vehicle (24), and the cost of conventional fuel ($2.75), the cost of the present vehicle can be calculated at $187.57. The vehicle operator can then have a hypothetical performance profile of an alternative fuel vehicle from which to compare the currently owned vehicle. In this example, the vehicle operator could save $141.35 by driving the alternative fuel vehicle. While this is one example of a hypothetical alternative fuel vehicle profile, others are possible. For instance, the profile also can be customized to analyze only weekend driving, only weekday driving, or particular periods of any day. And the hypothetical profile can be presented to the vehicle operator in a variety of ways. For example, the hypothetical profile can be presented to the vehicle operator in the vehicle 12 using the visual display 38. Also, the hypothetical profile can be sent to an email account or via short message (SMS) to a wireless telephone or PDA.

In addition, the vehicle performance metrics received from the vehicle 12 can be used to make design decisions affecting alternative fuel vehicles. More specifically, the vehicle performance metrics include data that can influence vehicle design decisions that can create alternative fuel vehicles that have performance characteristics better matching the metrics. An example of a vehicle design decision is the battery size and/or power rating for an alternative fuel vehicle. For instance, an alternative fuel vehicle can use a battery sized to provide energy for travelling seven miles. In another alternative, the battery can be sized to provide energy for travelling forty miles. If a significant number of vehicle operators use their vehicles to drive forty miles, then vehicle designers can choose to provide the battery sized for forty miles. In another example, the choice of batteries can include different models of alternative fuel vehicles each equipped with a different sized battery and apportioning the size of each vehicle battery based on the proportion of vehicles having vehicle performance metrics that would benefit from each particular size. The method 200 proceeds to step 240.

Figure 3:
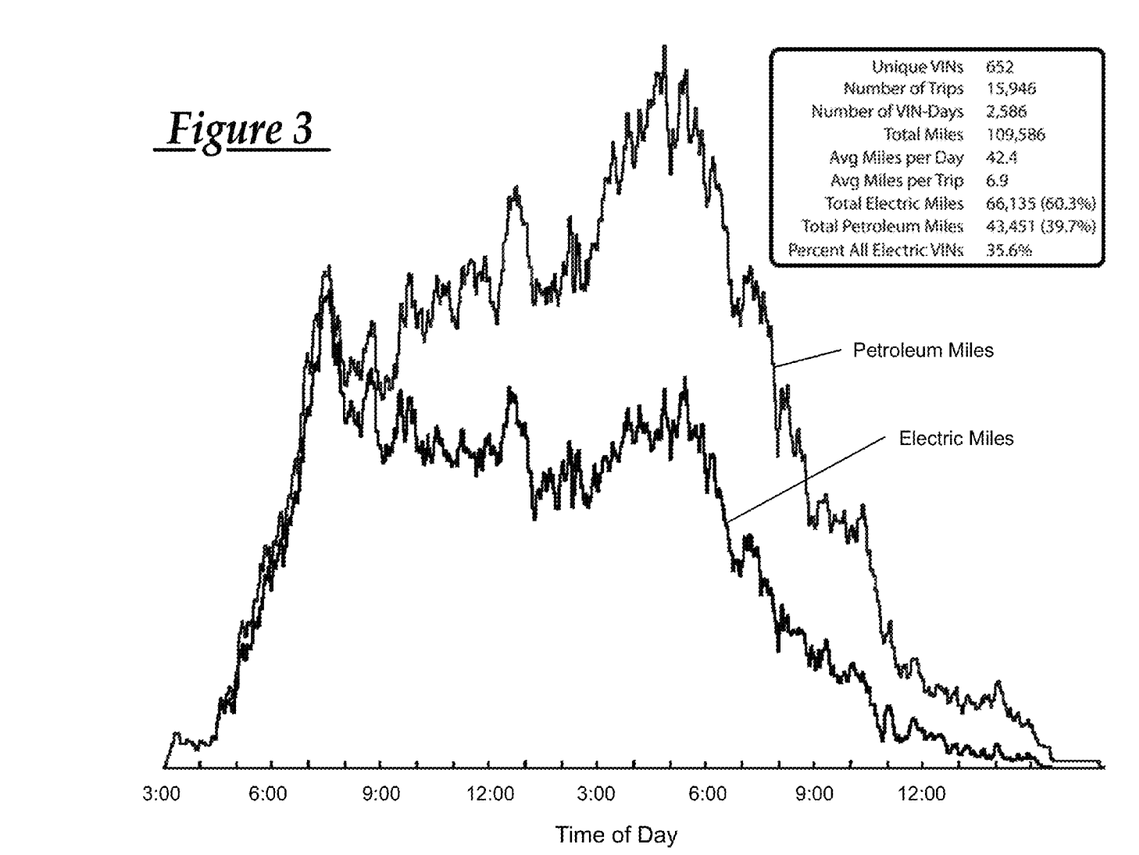
FIG. 3 is an exemplary embodiment of a graph depicting the number of miles travelled by a plurality of vehicles monitored at various times per day.
Figure 4:
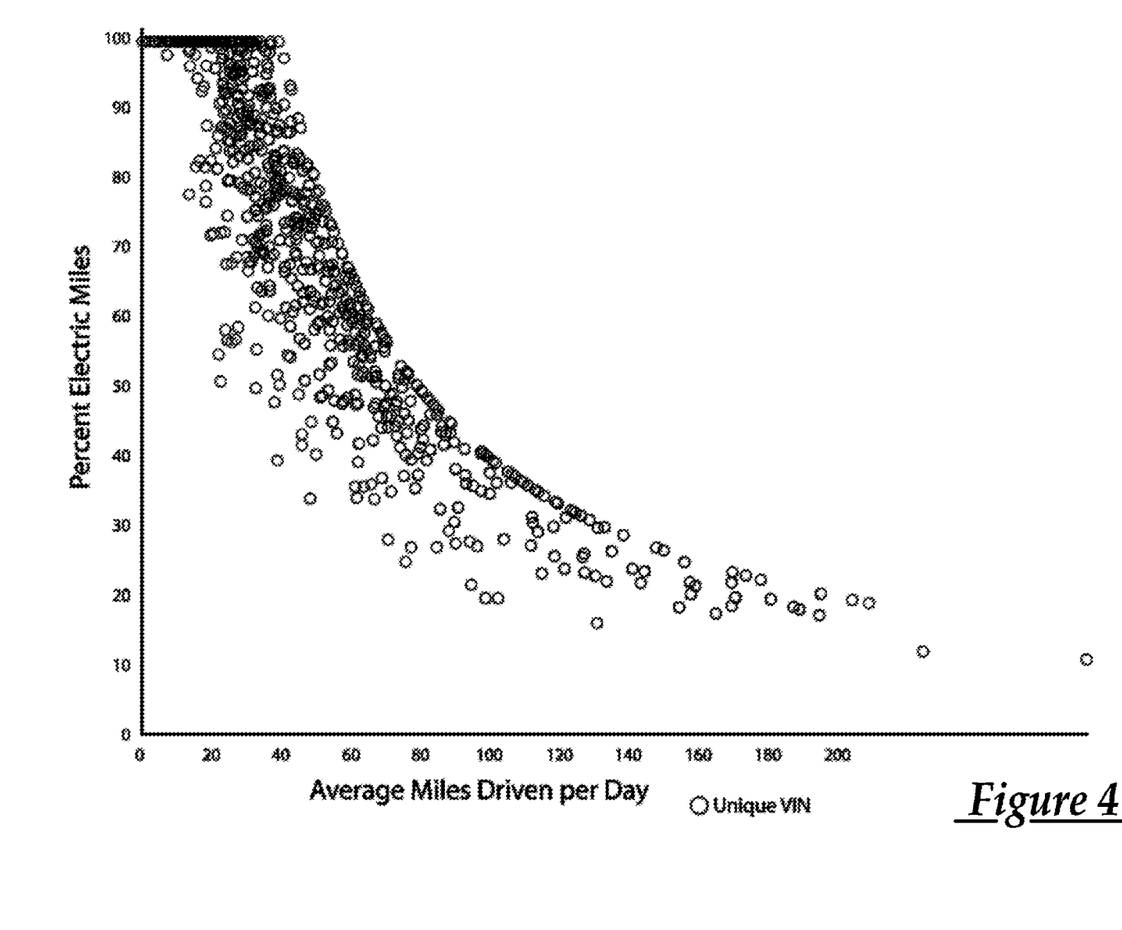
FIG. 4 is an exemplary embodiment of a graph of the average miles driven each day versus the percentage of those miles that can be electrically-propelled for each monitored vehicle.
Figure 5:
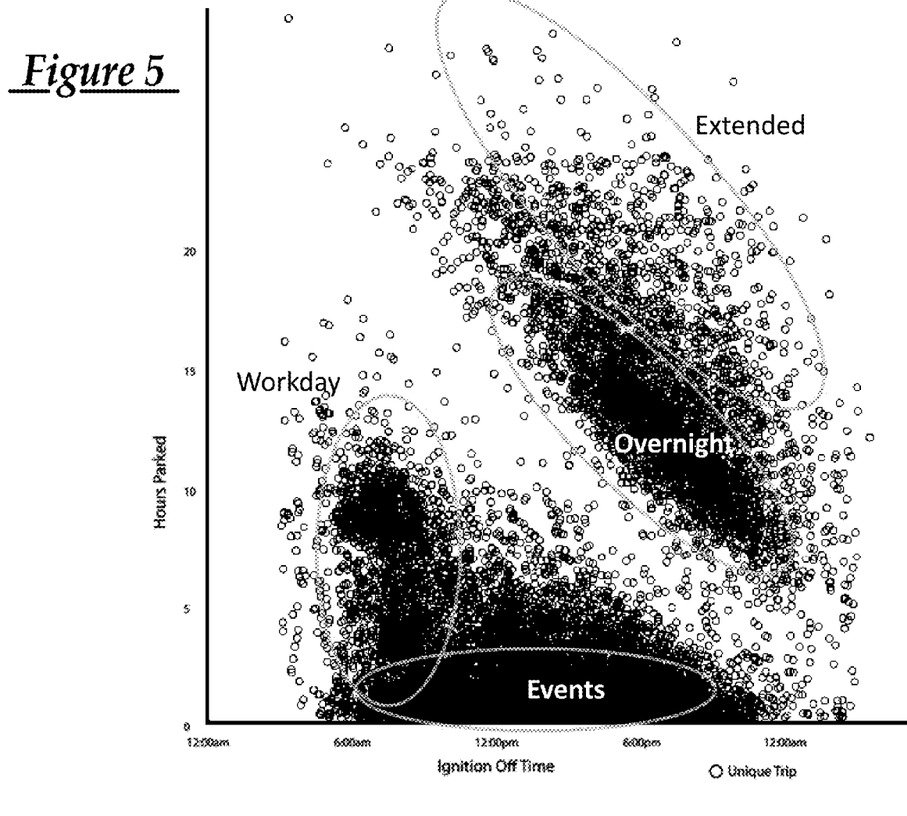
FIG. 5 is an exemplary embodiment of a graph depicting the time the last ignition off event occurred in a day plotted against the number of hours the vehicle was parked subsequent to the ignition off event.
Figure 6:
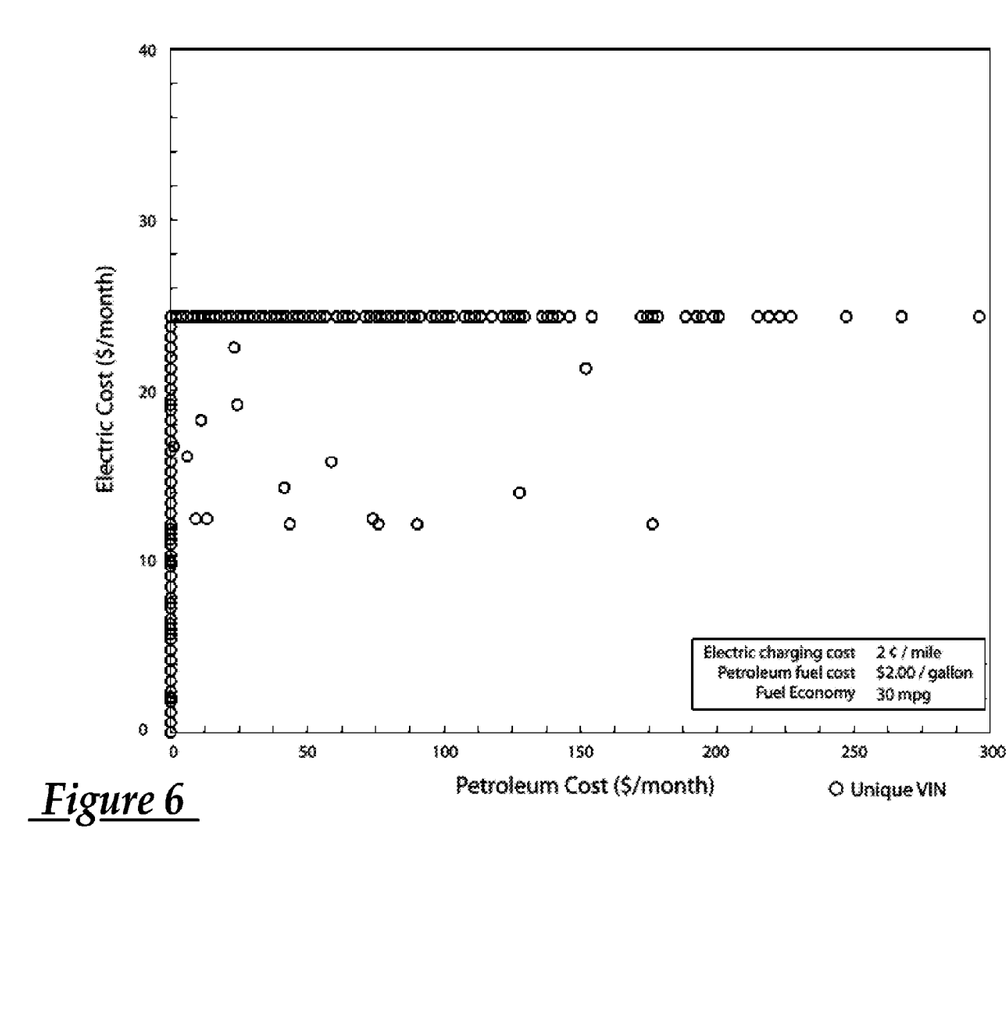
FIG. 6 is an exemplary embodiment of a graph depicting the average miles travelled each day by the one or more vehicles monitored and the number of those miles that would be propelled by electricity alone versus the average number of miles driven by the vehicles.

At step 240, vehicle performance metrics and/or the hypothetical alternative fuel vehicle profile are compared and presented to the vehicle operator. This comparison can be done in any of a variety of ways including by graphically displaying one or more of the actual vehicle performance metrics along with the determined hypothetical alternative fuel vehicle performance metrics. Unique configurations of graphical displays can aid the vehicle operator or vehicle designer in interpreting the vehicle performance metrics or hypothetical alternative fuel profile. Some examples of these graphic displays are shown in FIGS. 3-6. These graphic displays can be viewed in the vehicle 12 using the display 38. The graphic displays can also be delivered to the vehicle operator via email, either using HTML or an embedded URL. In another example, this information could be posted to a website that could be accessed by the vehicle operator. Turning to FIG. 3, a graph is shown depicting the number of miles travelled by a group of vehicles monitored at various times per day. The lower graphed line indicates the number of miles driven by the one or more monitored vehicles at a particular time of day that would be electrically powered miles, the upper graphed line indicates the total number of miles driven by the one or more vehicles, and the distance between the upper and lower graph indicates the number of those miles that would be powered by conventional fuel. FIG. 4 depicts a graph of the average miles driven each day versus the percentage of those miles that can be electrically-propelled for each monitored vehicle. FIG. 5 is a graph depicting the time that the last ignition off event occurred in a day plotted against the number of hours the vehicle was parked subsequent to the ignition off event. This graph may provide a graphical representation vehicle operator behavior. For instance, the graph of FIG. 5 shows four clusters of parking events. One is a workday cluster in which the vehicle was parked between four and ten hours and started between 6:00-10:00 AM, which can indicate when the vehicle operator begins a drive to work and how long the drive lasts. Another cluster is the overnight cluster. This cluster can indicate the start time and duration of the vehicle operator's drive from work to home. A third cluster is the extended cluster that depicts a vehicle parked over an extended time when the vehicle operator is not using the vehicle for commuting, such as a weekend or a holiday. And the fourth cluster can indicate vehicles that are used for short trips throughout the day. The graph in FIG. 5 can help vehicle designers understand vehicle operator habits based on the relative density of trips in any cluster. The graphs of FIGS. 3-5 each show data taken over a one week period. Turning to FIG. 6, a graph depicts the average miles travelled during a single, particular day by the vehicles monitored and the number of those miles that would be propelled by electricity alone versus the average number of miles driven by the vehicles. These are some examples of graphical depictions, however it should be appreciated that other representations of these metrics are possible. The method then 200 ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining expected performance of an alternative fuel vehicle based on actual use of an existing vehicle, comprising the steps of:
   (a) obtaining, by a call center, trip data from an existing vehicle driven by a vehicle operator;
   (b) determining, using the call center, performance metrics of the vehicle based on the trip data;
   (c) determining, using the call center, simulated performance metrics of an alternative fuel vehicle based on the trip data;
   (d) comparing, using the call center, the performance metrics of the existing vehicle and the simulated performance metrics of the alternative fuel vehicle; and
   (e) presenting the comparison to the operator.

2. The method of claim 1, further comprising the step of creating a chained trip by waiting until a predefined period of time has passed after an ignition off event to upload the trip data.

3. The method of claim 1, wherein the performance metrics of the existing vehicle further comprise one or more of: a trip duration and time of day, a time and day of an ignition on event, a time and day of an ignition off event, the average miles per trip, a number of trips taken in the existing vehicle, or an average number of miles driven per day.

4. The method of claim 1, wherein the simulated performance metrics further comprises the total number of miles travelled that would be electrically-powered if driven in the alternative fuel vehicle or the total number of miles travelled that would be petroleum-powered if driven in the alternative fuel vehicle, or both.

5. The method of claim 1, further comprising the step of saving the performance metrics of the existing vehicle based on a unique vehicle identifier.

6. The method of claim 1, further comprising the step of displaying the comparison to the operator in the form of a graph.

7. The method of claim 1, further comprising the step of sending the comparison to the operator in the form of an SMS message or an email.

8. A method of determining expected performance of an alternative fuel vehicle based on actual use of an existing vehicle, comprising the steps of:
   (a) sending, using a telematics unit of the existing vehicle, an ignition-on time stamp and odometer reading from a plurality of vehicles to a call center;
   (b) sending, using the telematics unit, an ignition-off time stamp and odometer reading from the plurality of vehicles to the call center;
   (c) determining, using the call center, vehicle trip data based on associated ignition-on and ignition-off time stamps and odometer readings from each of the vehicles;
   (d) processing, using the call center, the vehicle trip data for the plurality of vehicles; and
   (e) calculating, using the call center, a theoretical range for an alternative fuel vehicle based on the processed data, wherein the theoretical range is based on the battery power of one or more batteries installed on the alternative fuel vehicle.

9. The method of claim 8, further comprising the step of creating a chained trip by waiting until a predefined period of time has passed after the ignition off time stamp to upload the ignition-off time stamp and associated odometer reading.

10. The method of claim 8, wherein the step of processing the trip data further comprises calculating one or more of: an average trip duration for each day of the week, an average time and day of an ignition on event, an average time and day of an ignition off event, an average miles per trip, an average number of trips taken in a vehicle, or an average number of miles driven per day.

11. The method of claim 8, wherein the step of calculating the theoretical range further comprises calculating the total number of miles travelled that would be electrically-powered if driven in the alternative fuel vehicle, or the total number of miles travelled that would be petroleum-powered if driven in the alternative fuel vehicle, or both.

12. The method of claim 8, wherein step (d) further comprises averaging the vehicle trip data and wherein the method further comprises the step of displaying the averaged vehicle trip data using a graph.

13. A method of determining expected performance of an alternative fuel vehicle based on actual use of an existing vehicle, comprising the steps of:
   (a) recording, using a telematics unit of the existing vehicle, a time stamp and odometer reading for one or more vehicles at ignition-on in a memory device;
   (b) uploading, using the telematics unit, the ignition-on time stamp and the odometer reading for one or more vehicles to a call center following the ignition-on;
   (c) recording, using the telematics unit, a time stamp and an odometer reading for the one or more vehicles at ignition-off in a memory device;
   (d) uploading, using the telematics unit, the ignition-off time stamp and the odometer reading for the one or more vehicles to the call center following the ignition-off;
   (e) calculating, using the call center, a plurality of trip durations and times of day based on the uploading of the ignition-on time stamp and the uploading of the ignition-off time stamp;
   (f) determining, using the call center, an average trip duration at periodic times during a day;

(g) determining, using the call center, the vehicle performance metrics of a particular vehicle based on a vehicle identifier and the ignition-on and ignition-off uploads for the particular vehicle;

(h) creating, using the call center, a hypothetical alternative fuel vehicle profile based on the determined vehicle performance of the particular vehicle; and (i) graphically displaying the determined average trip durations and times of day, the performance metrics of the particular vehicle, and the hypothetical alternative fuel vehicle profile to a vehicle operator.

14. The method of claim 13, further comprising:

creating a chained trip by waiting until a predefined period of time has passed after an ignition off event to upload the ignition-off time stamp and the odometer reading.

15. The method of claim 13, wherein the vehicle performance metrics of a vehicle further comprises one or more of: a trip duration and time of day, a time and day of an ignition on event, a time and day of an ignition off event, an average miles per trip, a number of trips taken in a vehicle, or an average number of miles driven per day.

16. The method of claim 13, further comprising the step of saving the performance metrics of the particular vehicle based on a unique vehicle identifier.

17. The method of claim 13, wherein the hypothetical alternative fuel vehicle profile further comprises the total number of miles travelled that would be electrically-powered if driven in the alternative fuel vehicle or the total number of miles travelled that would be petroleum-powered if driven in the alternative fuel vehicle, or both.

18. The method of claim 13, further comprising the step of sending the comparison to the operator in the form of an SMS message or an email.

19. The method of claim 13, further comprising the step of receiving a request from the vehicle operator to begin obtaining vehicle operator driving habits.

* * * * *